United States Patent
Pruitt (10) Patent No.: US 7,051,548 B2
(45) Date of Patent: May 30, 2006

(54) AIR CONDITIONER

(76) Inventor: Roger Pruitt, 43495 Longhorn, Banning, CA (US) 92220

( * ) Notice: Subject to any disclaimer, the term of this patent is extended or adjusted under 35 U.S.C. 154(b) by 0 days.

(21) Appl. No.: 10/629,121

(22) Filed: Jul. 28, 2003

(65) Prior Publication Data
US 2004/0069003 A1   Apr. 15, 2004

Related U.S. Application Data

(60) Provisional application No. 60/405,584, filed on Aug. 23, 2002.

(51) Int. Cl.
*F28D 5/00* (2006.01)
(52) U.S. Cl. .......................... 62/314; 62/310
(58) Field of Classification Search ................ 62/314, 62/305, 309, 315, 121, 310
See application file for complete search history.

(56) References Cited

U.S. PATENT DOCUMENTS

| | | | |
|---|---|---|---|
| 4,002,040 A * | 1/1977 | Munters et al. ............... 62/121 |
| 4,023,949 A * | 5/1977 | Schlom et al. ............... 62/309 |
| 4,090,370 A * | 5/1978 | Vaughan ....................... 62/91 |
| 4,137,058 A * | 1/1979 | Schlom et al. ............... 62/121 |
| 4,156,351 A * | 5/1979 | Schlom et al. ............... 62/121 |
| 4,407,134 A   | 10/1983 | Snaper |
| 4,544,513 A * | 10/1985 | Otterbein .................... 261/153 |
| 4,658,597 A * | 4/1987 | Shum ......................... 62/235.1 |
| 4,674,295 A * | 6/1987 | Curtis, Sr. ................... 62/309 |
| 4,773,471 A   | 9/1988 | Grant et al. |
| 5,146,762 A   | 9/1992 | Atkins |
| 5,187,946 A * | 2/1993 | Rotenberg et al. ............ 62/314 |
| 5,408,838 A * | 4/1995 | Yaeger et al. ................. 62/92 |
| 5,800,595 A * | 9/1998 | Wright ......................... 95/288 |
| 5,911,745 A   | 6/1999 | Conner |
| 6,385,987 B1* | 5/2002 | Schlom et al. ................ 62/304 |
| 6,434,963 B1  | 8/2002 | Urch |
| 2002/0062550 A1 | 5/2002 | Dukhan et al. |

* cited by examiner

*Primary Examiner*—Chen-Wen Jiang
(74) *Attorney, Agent, or Firm*—Bruce A. Jagger (57) ABSTRACT

A process and the required apparatus for air conditioning the interior of a structure located within a harsh desert like exterior environment. The air conditioning system is particularly effective at times when the exterior temperature is in excess of approximately 90 to 95 degrees Fahrenheit, and the exterior relative humidity is less than approximately 35 to 40 percent. A tube and shell heat exchanger wherein the shell side is wet and the tube side is dry is employed to air condition the interior of the structure. In the operation of the air conditioner, a mass of distributed water, for example, a spray, is established on the wet shell side, and a flow of ambient air is passed through the wet shell side to form a resulting stream of moist air. A flow of ambient air is passed through the dry tube side and a resulting stream of dry cooled air is recovered. The streams of moist and cooled air are combined and the resulting stream of combined air is discharged into the exterior of the structure. The structure is not hermetically sealed so there is little or no pressure difference between the interior of the structure and the surrounding environment. The system requires so little power that it can be operated on a battery system charged from an ambient energy source harvested by, for example, a small wind turbine or an array of conventional 30 volt 4 amp hour solar power cells. The water consumption rate is generally less then approximately 10 percent that of a conventional evaporative cooler. The humidity in the interior of the structure is generally no more than approximately 2 to 2.3 times that of the exterior environment.

16 Claims, 5 Drawing Sheets

AIR CONDITIONER

RELATED APPLICATION

Applicant claims the benefit U.S. Provisional Application No. 60/405,584, filed Aug. 23, 2002.

BACKGROUND OF THE INVENTION

1. Field of the Invention

The invention relates in general to low power air conditioning systems, and, in particular, to a low power air conditioning system employing a tube and shell heat exchanger for use in arid conditions.

2. Description of the Prior Art

The provision of air conditioning for structures that are located in arid, high temperature deserts is essential to enjoying a good quality of life, and, in some instances, is essential to supporting life. This is true for both humans and livestock.

In desert environments, daytime temperatures often reach well above 100 degrees Fahrenheit while at the same time the relative humidity is often below 20 percent. Typically, conventional evaporative cooling based air conditioning systems, so called "swamp coolers", are effective in such conditions, because of the low humidity. A source of electrical power is required to operate such systems, so the cost of operation is a limitation on their use. Conventional evaporative coolers consume considerable quantities of water so their use is limited to areas where water is available. Sufficient quantities of water are not always available in desert environments. Other types of air conditioning systems require the use of refrigerants, sealed buildings, expensive and high maintenance equipment, and are expensive to operate. Some dwellings and particularly buildings in which livestock may be kept are not well sealed or insulated so there is little impediment to the interiors of such structures reaching thermal equilibrium with the exterior environment. Typically, such structures are not provided with air conditioning systems because of the cost of operating them and the general ineffectiveness of air conditioning systems in such structures. Most air conditioning systems operate on electricity, and electricity is not always available, or is not available at a reasonable price where the structures are located. It would be greatly beneficial to both human beings and livestock if an effective, simple, self-contained air conditioning system could be provided for desert environments that would operate inexpensively in unsealed structures.

In its simplest form evaporative cooling of buildings has been accomplished by injecting a fog or mist of water into a moving stream of air. See, for example, Atkins, U.S. Pat. No. 5,146,762. One problem with this system is that it causes excess humidity within the building resulting in algae and bacteria problems. Atkins proposes to minimize some of these problems by placing exhaust fans at one end of a building widely spaced from fogger nozzles at the opposite end of the building. The disclosed rate of water consumption is very high. In excess of 95 percent of the water supplied to the fogger nozzles is consumed. Atkins' evaporative cooling system is said to produce a temperature drop of approximately 20 degrees.

Conventional evaporative cooling systems have been combined into more elaborate systems that include heating means. See, for example, Grant et al. U.S. Pat. No. 4,773,471. Conventional evaporative cooling systems have also been combined into elaborate systems with refrigerated air systems. See, for example, Conner U.S. Pat. No. 5,911,745.

Urch U.S. Pat. No. 6,434,963 discloses an air cooler with two air flow paths, namely, an inlet path for outside air and an outlet path for stale air. A heat exchanger pre-cools the fresh air with heat extracted from the stale air, and further cooling is achieved by means of an evaporative cooler that spans the two air flow paths.

Those concerned with these problems recognize the need for an improved air conditioning system.

BRIEF SUMMARY OF THE INVENTION

A preferred embodiment of the air conditioning assembly according to the present invention comprises a shell and tube heat exchanger wherein ambient air is forced through both sides and discharged approximately together into the interior of the structure that is to be cooled. For convenience, the air streams from the two sides can be combined into one combined stream before being discharged into the interior of the structure, or they may be discharged separately into the structure. This heat exchanger is particularly suited for use in the high heat and low humidity conditions that are typically found during the summer months in deserts. The air conditioning assembly is particularly effective in situations where the temperature is above approximately 80 degrees Fahrenheit, and the relative humidity is below approximately 40 percent, and, preferably, below approximately 35 percent. The assembly is suitably operable even in situations where the structure to be air conditioned is not tightly sealed, that is where there may be openings through the structure that are substantially unobstructed to air flow having as much as, for example, six square inches to a square foot or two of area. Barns, tents, temporary structures and the like are provided with an efficient, reliable, economical, simple, and effective air conditioning system according to the present invention. The air conditioning system according to the present invention does not require an elaborate or expensive installation for its functioning. It can be easily transported to and set up inside of a temporary structure such as, for example, a tent.

The shell side of the heat exchanger is preferably wet with a shower or weep of a liquid such as water, and the air flow is turbulent through the shell side. The stream of flowing air is directed from the shell side to an outlet. The air flowing through the tube side is cooled by contact with the walls of the tubes, and is discharged to an outlet. Preferably the air streams from the shell and tube sides are combined and discharged into the interior of the structure that is to be cooled. These air streams can be combined after discharge into the interior of the structure, if desired. Preferably, the intake and discharge of the air streams are all within the interior of the structure.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of structures. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Referring now to the drawings wherein like reference numerals designate identical or corresponding parts throughout the several views, there is illustrated generally at 10 a tube and shell heat exchanger, which is particularly adapted for use as a low power air conditioning unit in high temperature low humidity conditions with structures that are not hermetically sealed. The floor plan of such a structure is indicated generally at 64 in FIG. 5.

Heat exchanger 10 is confined within external case 62. For purposes of illustration, external case 62 is shown as rectangular, but other arcuate, spherical, or cylindrical forms are contemplated within the scope of the present invention.

Air, preferably internal air from near the ceiling of a structure that is to be cooled, is drawn into the tube side of the heat exchanger through inlet port 12 into intake plenum 14 of heat exchanger 10. Air is drawn into inlet port 12 by exhaust fan 46. Air is drawn from intake plenum 14 through heat exchange tubes 34 into exhaust plenum 18. Tube inlet ends 36 are sealingly mounted in inlet tube sheet 60, and tube outlet ends 38 are sealingly mounted in tube outlet sheet 32. Exhaust fan 46 expels the air from the tube side of the heat exchanger into tube side exhaust conduit 22.

Figures 1, 2:
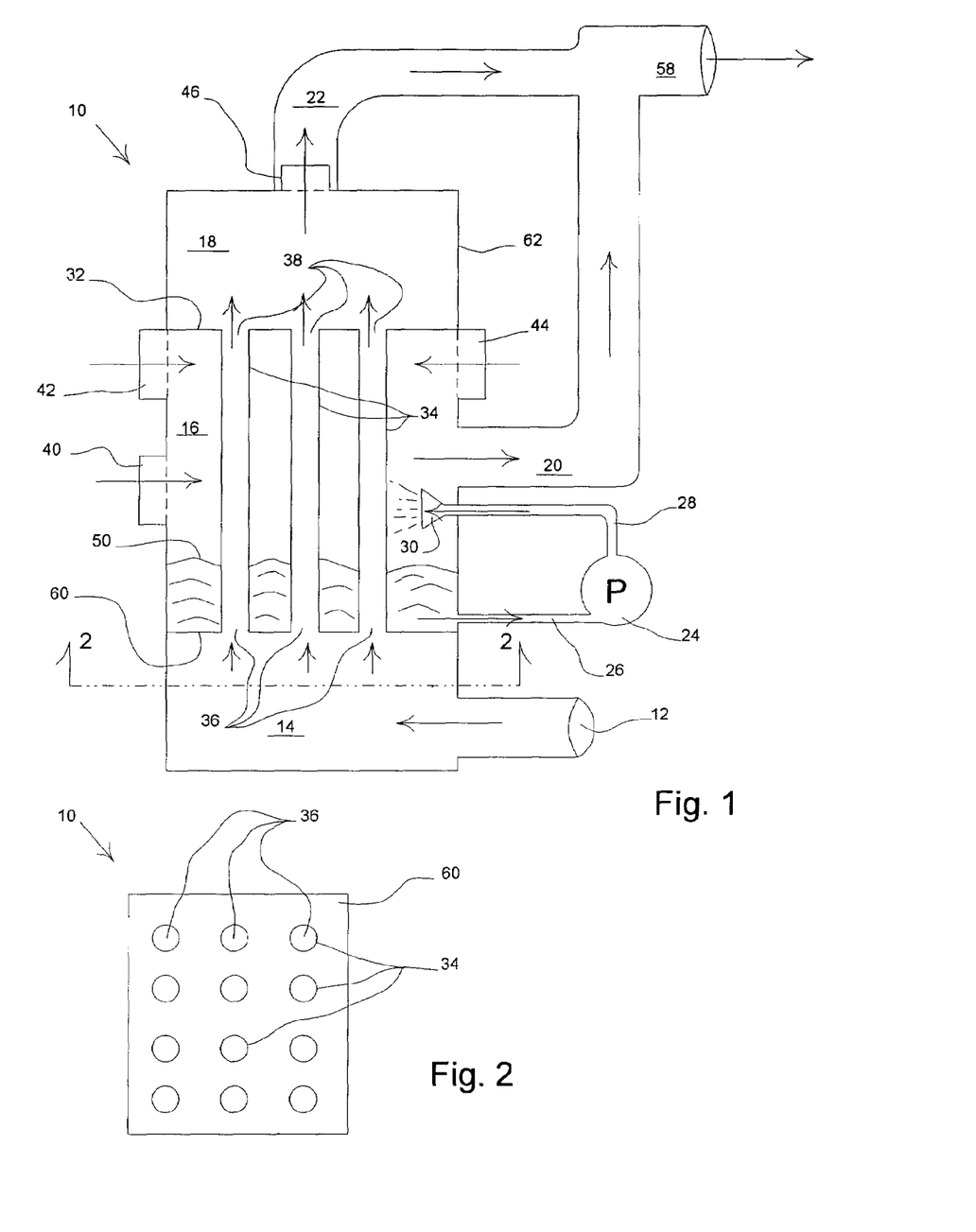
FIG. 1 is a diagrammatic view of a preferred embodiment of a tube and shell heat exchanger according to the present invention.
FIG. 2 is a cross-sectional view taken along line 2—2 in FIG. 1.

The shell side of heat exchanger 10 is in the form of a shell plenum 16 that surrounds heat exchange tubes 34 between inlet tube sheet 60 and outlet tube sheet 32. Heat exchange tubes 34 are shown for the purposes of clarity of illustration as being straight, but, as will be understood by those skilled in the art, other forms such as coiled or looped heat exchange tubes can be used. A body of liquid, preferably water, is disposed within the shell side of heat exchanger 10. The surface of the body of liquid is indicated at 50. The liquid generally occupies less than one-half, and preferably, less than one-quarter of the volume of the shell side of the heat exchanger. The bottom portion of the shell plenum 16 forms a liquid sump in which the liquid resides. At least one, and preferably at least two fans are position to force ambient internal air from within the structure into shell plenum 16 of heat exchanger 10. In FIG. 1, three such shell side input fans are indicated at 40 (first input fan), 42 (second input fan), and 44 (third input fan). These fans together generate substantial turbulence in the air on the shell side of heat exchanger 10. The air from shell plenum 16 is expelled from heat exchanger 10 through shell side exhaust conduit 20.

The liquid in the sump within shell plenum 16 is sprayed over the heat exchange tubes 34. One form of a spray system is illustrated in FIG. 1, and consists of a pump feed line 26 that serves to convey liquid from the liquid sump on the shell side to liquid pump 24. Pump 24 supplies energy to the liquid and discharges it through pump discharge line 28 to spray head 30 where it is sprayed over the shell sides of heat exchange tubes 34. Spray head 30 is typically located at or near the top of the shell side plenum, although this is not necessary to the operation of the system. It is schematically illustrated here on the side of the shell side plenum for ease of illustration. The liquid runs and falls back down into the sump where it is recycled again. The liquid spray enhances the heat transfer between the heat exchange tubes 34 and the liquid, as well as rapidly increasing the humidity of the air in the shell plenum 16. Preferably, the liquid level is automatically maintained at about a constant level by means of a conventional float actuated valve connected to a supply of liquid (not shown).

Figure 3:
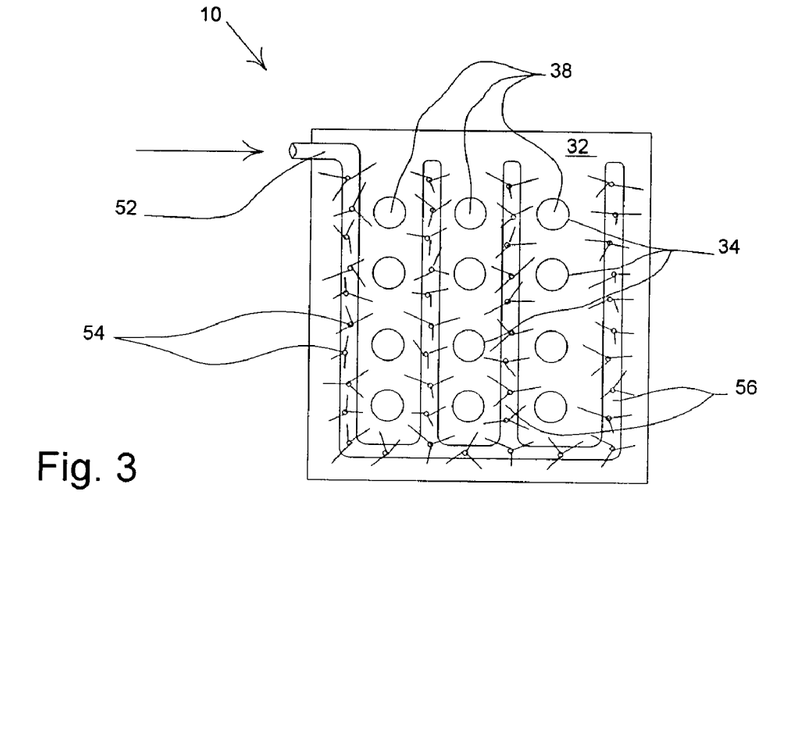
FIG. 3 is a diagrammatic cross-sectional view taken through the shell plenum of a further embodiment according to the present invention showing a liquid spray system.
Figure 4:
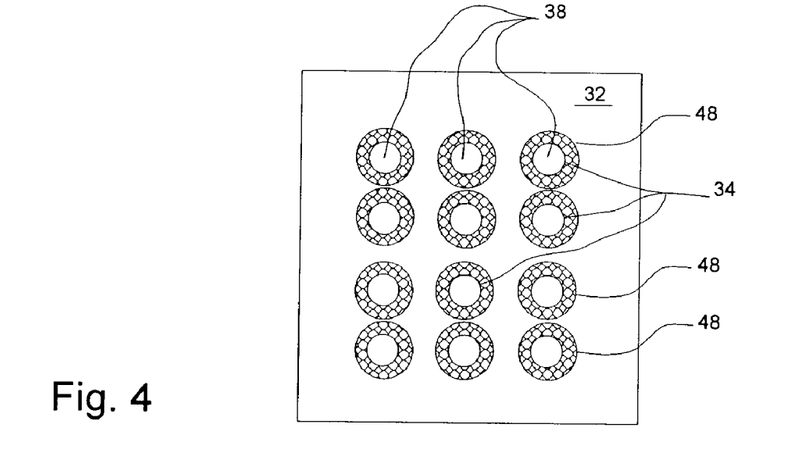
FIG. 4 is a diagrammatic cross-sectional view taken through the shell plenum of a further embodiment according to the present invention showing the tubes fully enclosed in blankets.

Heat transfer between the liquid and the heat exchange tubes 34 is further enhanced by the provision of blanketing members, for example, tubular foam blankets 48 (FIG. 4), or loose reticulated foam sheets 104 (FIG. 6) positioned in physical contact with the heat exchange tubes 34. Also, the humidification of the air in shell plenum 16 is enhanced by the presence of blanketing members of some form. The blanketing members hold the liquid against the heat exchange tubes 34, and increase the surface area of the liquid within shell plenum 16. In general the blanketing members comprise inert reticulated material through which liquid and vapor phase liquids flow easily. Numerous such reticulated materials are known, including, for example, many natural and synthetic open pore foams, felts, battings, woven materials, and the like. Conventional commercial swamp cooler pads are generally suitable for use as the blanketing elements. Often such materials include bacteriastats, fungistats, and the like. The blanketing materials can completely or partially enclose heat exchange tubes 34, as desired. Compare, for example, FIGS. 4 and 6. For the sake of clarity of illustration, these blanketing members are not illustrated in FIGS. 1, 2, and 3, but they are preferably employed in some form.

Various liquid spray systems can be employed. A particularly effective system is illustrated particularly in FIG. 3. Liquid from a suitable source such as, for example, the sump in shell plenum 16, is supplied under pressure to spray header 52 and distributed to spray header branches 56. Liquid is expelled in a shower from spray ports 54. Preferably, spray header 52 is positioned at the normally upper end of shell plenum 16 adjacent to outlet tube sheet 32 so that liquid showers down over the heat exchange tubes 34 and any associated blanket material, and is acted upon by the turbulent air flow from the shell side fans 40, 42, and 44.

The air exhausted from the tube side through exhaust conduit 22 is preferably mixed with the air exhausted from the shell side through exhaust conduit 20. The combined air streams are discharged to the ambient interior of the structure that is being cooled through combined exhaust conduit 58.

Figure 5:
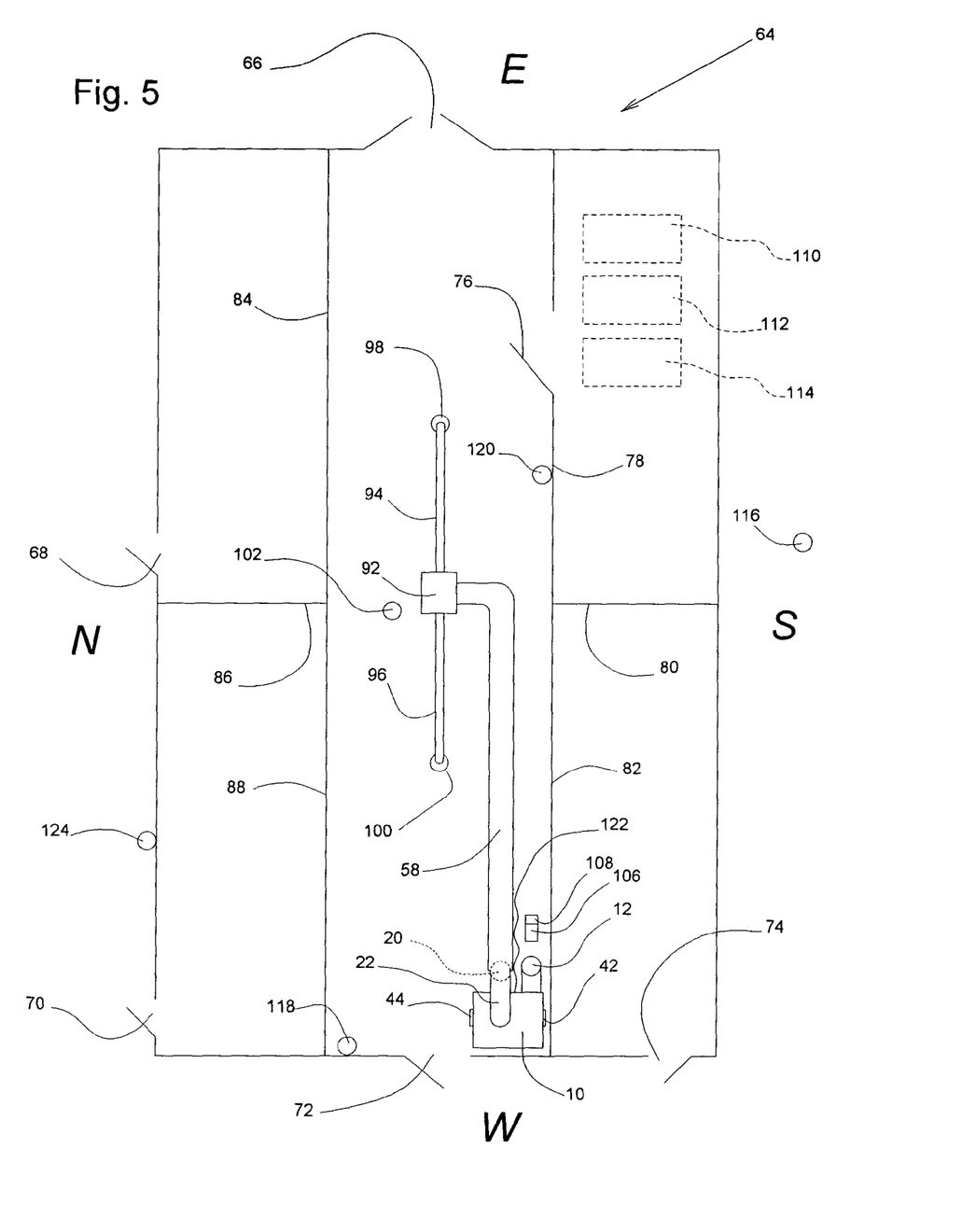
FIG. 5 is a plan view of a structure in which a tube and shell heat exchanger air conditioning system according to the present invention has been installed.
Figure 6:
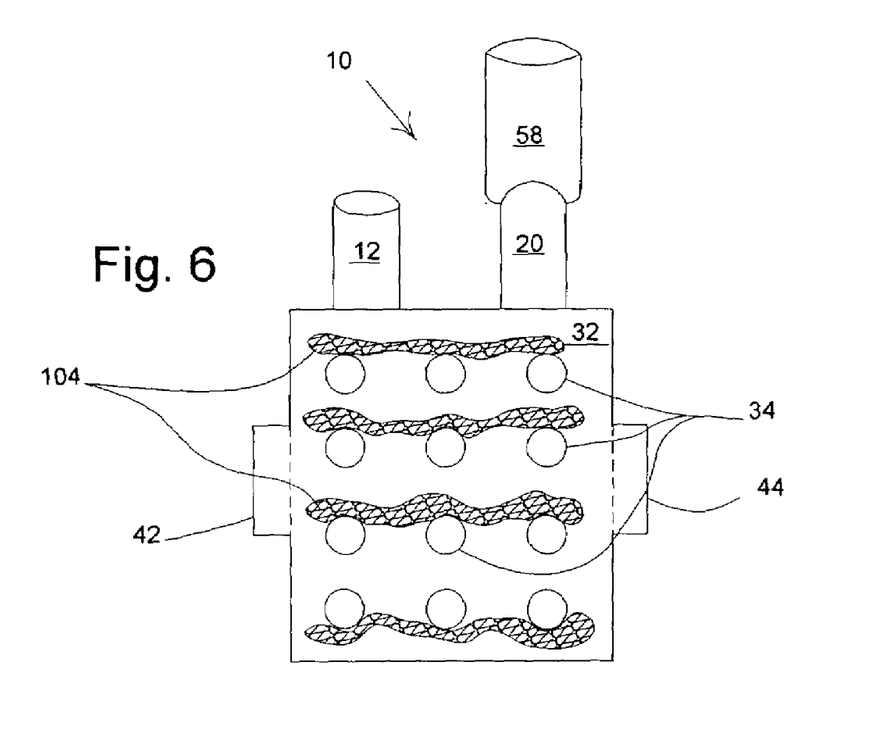
FIG. 6 is a cross-sectional view of the heat exchanger of FIG. 5 taken through the shell plenum.

The best mode presently contemplated is illustrated particularly by reference to FIGS. 5 and 6. An unfinished barn indicated generally at 64 has a rectangular shape about 30 feet wide and 50 feet long. Barn 64 is oriented east to west along its long axis as indicated by the letters N, S, E, W, in FIG. 5. Barn 64 has an uninsulated peaked metal roof, exposed 2 by 4 wooden stud walls, and a stucco exterior finish. The peak of the roof is about 10 feet from the floor, and the exterior walls are about 8 feet high. The interior volume of barn 64 is approximately 13,500 cubic feet. The exterior doors are not weather sealed and the total unsealed area around the exterior doors 66, 68, 70, 72, and 74 combined is from approximately 1 to 2 square feet. No significant pressure differential exists between the interior of barn 64 and the external environment, and any moisture content differential between the interior of barn 64 and the ambient environment tends rapidly towards equilibrium. Stall partitions 82, 84, 86, and 88 are half height, and stall dividers 80 and 78 are full height extending to within approximately 6 inches of the roof. Interior gate 76 is a full height security screen door.

The air conditioning system employed in barn 64 consists of tube and shell heat exchanger 10, combined exhaust conduit 58, air distribution chamber 92, air distribution branches 94 and 96, and air outlet heads 98 and 100. Input fans 42 and 44 supply ambient air from the interior of barn 64 to the shell plenum in heat exchanger 10. The air is typically drawn into the shell side of the heat exchanger from a level well below the level at which air is discharged at 98 and 100. Air is preferably drawn into the tube side of the heat exchanger from the hottest part of the structure adjacent to the uninsulated roof. Air exhausted from the tube side of heat exchanger 10 through tube side exhaust conduit 22 mixes with air exhausted from the shell side through conduit 20, and flows through combined exhaust conduit 58 to air distribution chamber 92. The air stream then splits and flows through each of air distribution branches 94 and 96 to respective air outlet heads 98 and 100. Air is drawn into the tube side of heat exchanger 10 through inlet port 12. Blanket material 104 (FIG. 6) in the form of conventional swamp cooler foam pads is in contact with tubes 34. A spray head of the general configuration shown in FIG. 3 positioned in the top of the shell plenum of heat exchanger 10. Preferably, approximately the lower one-quarter of the shell plenum is filled with water.

The rectangular exterior case of heat exchanger 10 is approximately 3 feet high by 2 feet by 2 feet, and it rests on the floor of barn 64. Input fans 42 and 44, mounted on opposed sides of the case, are 14 inches in diameter, run at 2,200 revolutions per minute, and operate on 12 volts of direct current. The rated amperage of these fans is 4 amps. The tube side exhaust fan 46 (FIG. 1) is a 12 inch, 12 volt, direct current, 4 amp fan. These fans are conventional automotive equipment, and they are typically used in association with conventional radiator cooling systems to pull air through the radiator of a liquid cooled internal combustion engine. The liquid pump 24 (FIG. 1) has a 12 volt, 7 amp, direct current motor, and a rated flow rate of 28 gallons per hour. The dimensions of the tube side intake plenum 14 (FIG. 1) are about 6 inches high by 24 inches by 24 inches. The dimensions of the tube side exhaust plenum 18 (FIG. 1) are about 6 inches by 24 inches by 24 inches. The dimensions of the shell side plenum 16 (FIG. 1) are about 24 by 24 by 24 inches. The heat exchange tubes 34 are straight sections of standard three-quarter inch cylindrical copper tubing having a length between tube sheets 32 and 60 of about 24 inches. There are 100 heat exchange tubes 34 arrayed in a generally regularly spaced rectangular pattern. The total surface area of the tubes 34 within shell plenum 16 is approximately 6,600 square inches. The intake port 12 for the tube side of the heat exchanger has a diameter of about 6 inches as do conduits 20 and 22. Intake port 12 opens upwardly and is positioned approximately 4 inches below the uninsulated metal roof of barn 64 so it is taking in approximately the hottest air within the interior of barn 64. Combined exhaust conduit 58 runs overhead, as do air distribution branches 94 and 96. The diameter of conduit 58 is about 8 inches, and conduit 58 is approximately 14 feet long. Each air distribution branch is approximately 10 feet long and 6 inches in diameter. The distribution box 92 is approximately 2 by 2 by 2 feet. The short leg of conduit 58 that runs into distribution box 92 is approximately 3 feet long. Air outlet heads 98 and 100 discharge downwardly at a height of approximately 9 feet above the floor.

The pump and fans have, for example, direct current motors powered by 5 conventional 12 volt deep cycle lead acid secondary batteries connected in parallel, indicated generally at 106. The batteries are connected through a conventional charging circuit indicated generally 108 to 3 conventional 30 volt, 4 amp hour solar panels indicated generally at 110, 112, and 114. The solar panels are mounted on the south facing pitch of the roof of barn 64. No other power source is required for the full time daylight operation of the air conditioning system. If desired, a conventional AC converter could be used to charge the batteries off of regular 110 volt house current, or some other power from a commercial utility service. This is not necessary, and would add to the cost of operation while limiting the system to use only at locations where commercial utility service is available. Likewise, the motors on the fans and pump could be replaced with conventional motors that would operate on power from a commercial utility service, but the costs of operation would be increased, and the flexibility of the system would be compromised.

The level of water in the sump is preferably maintained at approximately 5 inches. At this level the sump contains approximately 1.67 cubic feet of water. The shell side plenum has a volume of approximately 8 cubic feet, so the water occupies approximately 21 percent of the volume of the shell side plenum 16. This provides an adequate reserve of water to continue operations for more than a day. Other sump volumes can be used if desired, ranging from, for example, approximately 10 to 30 percent of the volume of the shell side plenum chamber 16. The sump need not be within the shell side plenum chamber. An external sump several times larger than the shell side plenum can be used if desired so as to provide for at least a week of unattended operation without replenishing the water supply. Less than a gallon of water is consumed during the course of the daylight hours in a typical summer day.

Barn 64 is located in a desert area where the daytime temperatures typically exceed 100 degrees Fahrenheit for several months during the summer, the relative humidity is often below 20 percent, and the sun shines for most of the daylight hours. Without air conditioning, the temperature at mid-day within barn 64 usually exceeds the outside temperature by at least approximately 10 degrees Fahrenheit.

The operation of the air conditioning system in barn 64 can be automated by providing a conventional thermostat (not shown) connected to the fans and pump circuits. Setting a thermostat at, for example, 74 degrees Fahrenheit, will activate the system early in the morning on a typical summer day, and keep it running well into the evening hours.

A preferred air conditioning assembly according to the present invention is fully self contained. That is, the power supply for the fan and pump motors is at the same location as the rest of the system. The water supply on the shell side of the heat exchanger can be replenished automatically by a float actuated valve on a water line, or manually, as desired. Where no reliable water supply is available, the rate of water consumption is so low that manual replenishment at widely spaced intervals is practical.

The power requirements are so small that a low voltage (12 or 24 volts) battery system coupled with a conventional solar panel driven charging circuit is sufficient to power the system during the daylight hours. The convenience of using a conventional solar panel charged battery system, and the widespread availability of such inexpensive systems, makes practical the unattended air conditioning of a wide variety of structures. Even livestock barns, for example, can be reliably and inexpensively air conditioned according to the present invention. Dwellings occupied by humans can likewise be air conditioned, even where very limited funds are available to devote to this purpose, and the dwellings are poorly sealed and uninsulated. The battery system can also be charged by wind turbines in areas where reliable wind flows are available. Other alternative energy sources can be used, if desired. Combinations of solar panels, wind turbines and other forms of alternative energy are suitable for use in charging the battery system. Since alternative energy sources typically do not deliver a constant level of energy, and the motors employed in the system require a substantially constant energy source, batteries are preferably interposed between the energy source and the air conditioning system. Where an alternative energy source is capable of delivering a constant source of energy, the use of a battery system is optional.

The air conditioning system according to the present invention was turned on in barn 64 at about 6:30 in the morning on a typical sunny summer day, and allowed to run all day. The inside temperature of barn 64 was measured at approximately location 102 (FIG. 5) approximately 4 feet above the ground, and the exterior temperature was measured in the shade under an open awning adjacent to the south side of barn 64 at approximately location 116. Location 116 is at a height of about 5 feet above the ground on a support for a 20 foot wide awning (not shown). The wooden awning is attached to the barn and extends outward from the level of the top of the wall of the barn 64 for about 20 feet. The wooden awning is completely open on three sides. The temperature at 116 is approximately what the temperature would be inside of barn 64 without the air conditioning system. The temperatures observed were as shown in Table 1 below.

TABLE 1

| Time | Inside temperature at 102, in ° F. | Exterior temperature at 116, in ° F. |
|---|---|---|
| 6:30 | 78 | Not Recorded |
| 7:30 | 72 | Not Recorded |
| 8:30 | 71 | Not recorded |
| 9:30 | 72 | 98 |
| 10:30 | 72 | 99 |
| 11:30 | 73 | 105 |
| 12:30 | 75 | 104 |
| 1:30 | 75 | 100 |
| 2:30 | 77 | 98 |
| 3:30 | 76 | 98 |

It has been observed that the temperature difference between the interior and exterior is the greatest when the humidity is the lowest and the outside temperatures are above 100 degrees Fahrenheit.

On a summer day when the sky was mostly overcast and the relative humidity was above approximately 35 percent, the following conditions were observed:

TABLE 2

| Time | Outside temperature at 116, in ° F. | Interior temperature at 102, in ° F. |
|---|---|---|
| 6:30 | 83 | Not Recorded |
| 9:30 | 85 | 75 |
| 10:30 | 90 | 74 |
| 11:30 | 90 | 82 |
| 12:30 | 92 | 80 |
| 1:30 | 92 | 80 |
| 2:30 | 90 | 79 |
| 3:30 | 91 | 76 |

Relative humidity measurements were taken at various locations in and around barn 64 on a sunny summer day commencing about 9:00 a.m. The readings at the locations indicated by the listed reference numbers in FIG. 5 were recorded in Table 3.

TABLE 3

| | Measurement Locations As Shown On FIG. 5 | | | | | |
|---|---|---|---|---|---|---|
| Time | 98 | 100 | 78 | 116 | 44 | 42 |
| 9:00 | 30% | 30% | 31% | 19% | 31% | 31% |
| 10:00 | 30% | 30% | 31% | 18% | 32% | 32% |
| 11:00 | 34% | 34% | 32% | 18% | 31% | 30% |
| 12:00 | 35% | 34% | 34% | 19% | 30% | 30% |
| 1:00 | 37% | 36% | 35% | 18% | 32% | 32% |
| 2:00 | 34% | 34% | 35% | 17% | 31% | 31% |
| 3:00 | 34% | 34% | 35% | 16% | 32% | 32% |
| 4:00 | 34% | 34% | 35% | 16% | 32% | 32% |

The relative humidity remains substantially stable and constant throughout the day and throughout the interior of the structure.

Commencing about 9:00 a.m., Temperature and relative humidity measurements (T/H) were taken throughout a sunny day at various locations within and adjacent to barn 64. The readings were taken at the locations indicated by the reference numbers in FIG. 5 and were recorded in Table 4. The measurements at locations 118 and 120 were taken about 5 feet above the floor. Location 118 gives an indication of the effect of radiation from the exterior wall. Location 124 is on the north side of the barn 64 about 5 feet above the ground. The measurements were as follows:

TABLE 4

| | Measurement Locations As Shown On FIG. 5 | | | | | | |
|---|---|---|---|---|---|---|---|
| | 116 | 120 | 98 | 100 | 118 | 122 | 124 |
| Time | T/H | T/H | T/H | T/H | T | T | T |
| 9:00 | 78/19 | 70/30 | 72.1/30 | 70.8/30 | 69.6 | 64.1 | 85.5 |
| 10:00 | 82/18 | 73/30 | 75.1/30 | 76.4/30 | 72.1 | 65 | 85.7 |
| 11:00 | 90/18 | 75/27 | 77.9/34 | 79.3/34 | 75.2 | 65.2 | 90.5 |
| 12:00 | 94/19 | 79.9/37 | 74.4/35 | 74.2/34 | 78.7 | 65.4 | 94.5 |
| 1:00 | 100/18 | 82.1/40 | 76.3/37 | 76.1/36 | 80.9 | 67.5 | 98.1 |

TABLE 4-continued

Measurement Locations As Shown On FIG. 5

| Time | 116 T/H | 120 T/H | 98 T/H | 100 T/H | 118 T | 122 T | 124 T |
|---|---|---|---|---|---|---|---|
| 2:00 | 106/17 | 83.5/37 | 77.8/34 | 77.9/34 | 83.9 | 69.8 | 100.1 |
| 3:00 | 116/16 | 83.1/37 | 79.2/34 | 79.4/34 | 87 | 71.9 | 107 |
| 4:00 | 118/16 | 85.7/34 | 80.6/34 | 80.6/34 | 89.7 | 71.4 | 108 |
| 5:00 | 118/17 | 86/32 | 81.2/na | 81.2/na | 93 | 71.8 | 107.3 |
| 6:00 | 112/13 | 87/32 | 84.3/na | 84.3/na | 94.7 | 72.4 | 108 |

The temperature and relative humidity measurements as reported in Table 4 were repeated under higher humidity conditions commencing about 10 a.m. on a somewhat cloudy day. The system was activated by a conventional thermostat set at about 74 degrees Fahrenheit. The results are set forth in Table 5.

TABLE 5

Measurement Locations As Shown On FIG. 5

| Time | 116 T/H | 120 T/H | 98 T/H | 100 T/H | 118 T | 122 T | 124 T | Volts |
|---|---|---|---|---|---|---|---|---|
| 10:00 | 86/33 | 78.5/44 | 73.6/31 | 73.6/31 | 71 | 69.2 | 81 | 12 |
| 11:00 | 92/27 | 79/49 | 75.7/32 | 75.7/32 | 74 | 68.4 | 88 | 11.6 |
| 12:00 | 92/23 | 79.5/47 | 76.7/31 | 77.1/31 | 75 | 69.3 | 89 | 11.4 |
| 1:00 | 95/23 | 80.1/47 | 77.4/31 | 77.5/31 | 79 | 71.2 | 97 | 11 |
| 2:00 | 97/20 | 80.2/45 | 79.6/33 | 79.9/32 | 79 | 74 | 98 | 9.4 |
| 3:00 | 98.3/20 | 83.0/30** | 81.6/34 | 81.7/34 | 80 | 73.8 | 98 | 9.7 |
| 4:00 | 106/20 | 84.1/41 | 81.6/34 | 81.9/34 | 92 | 74.5 | 99 | 9.6 |
| 5:00 | 110/22 | 84.1/42 | 82.1/34 | 82.2/31 | 94 | 74.2 | 101 | 9.1 |
| 6:00 | 110/25 | 85/43 | 82.8/35 | 82.8/35 | 94 | 74.4 | 101 | 10.3* |
| 7:00 | 102/33 | 85/47 | 81.2/35 | 81.7/35 | 91 | 74.2 | 100 | 10.0 |
| 8:00 | 96/42 | 83.1/47 | 80.1/35 | 79.2/35 | 90 | 73.6 | 96 | 11.1 |
| 9:00 | 84/42 | 80.1/47 | 76.3/36 | 77.1/36 | 89 | 72.5 | 81 | 12 |
| 10:00 | 77/44 | 78.1/47 | 74.1/34 | 74.7/34 | 87 | 71.1 | 77 | 12.5 |
| 11:00 | 75/44 | 76.1/47 | 74.0/34 | 74.1/34 | 83 | 69.4 | 74 | 12.5 |
| 12:00 | 75/44 | 73.1/46 | 73.4/32 | 73.4/32 | 79 | 67.1 | 74 | 12.5 |

*A conventional 110 volt battery charger was connected to the nominal 12 volt battery system at about 6 p.m. The effectiveness of the solar battery charging system was diminished by occasional cloud cover during the day.
**This relative humidity reading is reported here as recorded, but, considered in light of the contemporaneous readings at locations 116, 98, and 100, it is believed to reflect an operator or instrument error, and is not considered to be reliable. It is not reflected in relative humidity curve 120-5 in FIG. 7.

Figure 7:
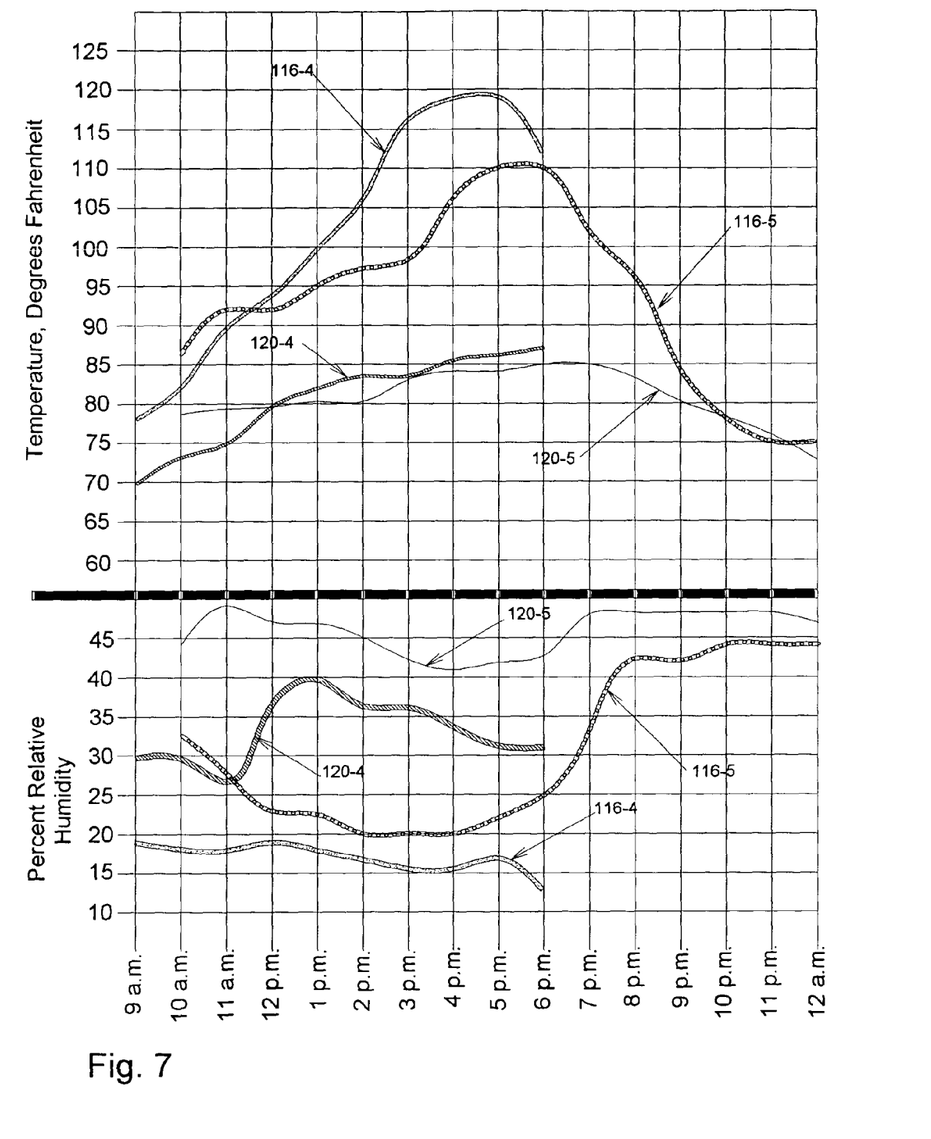
FIG. 7 is a chart of the temperature and relative humidity readings recorded in Tables 4 and 5 at location 116 and 120 in FIG. 5.

The curves in FIG. 7 are based on the data recorded in Tables 4 and 5 at locations 116 and 120 in FIG. 5. The relative humidity and temperature curves 116-4 in FIG. 7, for example, were drawn based on the data in the column headed "116 T/H" in Table 4, and curves 116-5 were drawn based on the data in the column headed "116 T/H" in Table 5. The last number following the dash "-" indicates which Table the information for the curve is taken from.

A comparison of the temperature differences between temperature curves 120-5 and 116-5 at various relative humidity readings, as shown by relative humidity curve 116-5, indicates that the air conditioning system according to the present invention is most effective at exterior temperatures above approximately 90 degrees Fahrenheit and relative humidity readings below approximately 40, and preferably below approximately 35 percent. At exterior relative humidity conditions below approximately 20 percent, temperature differences of as much as approximately 35 degrees Fahrenheit were achieved. See, for example, the differences between temperature curves 116-4 and 120-4 and relative humidity curve 116-4 in FIG. 7. While the temperature in the open shade reached almost 120 degrees Fahrenheit, the temperature in barn 64 did not reach over about 87 degrees Fahrenheit. A temperature of 120 degrees is life threatening while a temperature of 87 degrees is generally not. The efficiency of the system is best when the relative humidity is below approximately 25 percent. See, for example, how temperature curves 120-5 and 116-5 quickly converge once the relative humidity exceeds approximately 35 percent, and actually cross at approximately 45 percent relative humidity.

The last column in Table 5 reflects a drop in the voltage of the battery system during the hours of peak demand. This voltage drop is reflected in a decrease in the volume of air that the various fans are able to move through the system. Although Applicant does not wish to be bound by any theory, it appears that there is a small temperature rise (temperature curve 120-5, FIG. 7) that may be correlated with the reduced volume of air moving through the system between approximately 2 p.m. and 6 p.m. The system appears to be relatively insensitive to small changes in the volume of air flowing through the system. Preferably, the voltage should be at least approximately 11 volts for optimum operation of the fan motors. Adding another one or two solar panels to the existing three panel array on the roof of barn 64 would provide enough capacity to hold this voltage during peak demand periods.

The column headed "122 T" in Table 5 indicates the exterior temperature of the shell side of the heat exchanger. The water within the shell side is typically approximately 10 to 15 degrees Fahrenheit cooler than location 122. This affords the opportunity to provide some cooling to objects placed in heat exchange relationship with this water. If access is provided to the shell side, small objects can be cooled somewhat without the expenditure of significant additional amounts of energy. The shelf life of small amounts of heat sensitive food stuffs or medicines can be extended by placing them in heat exchanging relationship with this water. Suitable containers can be placed directly in the water on the shell side, or a cabinet accessible from the outside can be built into the shell side, or a stream of water circulated through, for example, cooling coils external to the shell side, or the like, can be utilized to effect the cooling of objects.

The column headed "118 T" in Table 5 gives a rough indication of the heat that is being radiated into the interior of the structure by the exterior walls. The column headed "124 T" provides a rough indication of the effect of cooling the interior of barn 64 on the temperature of the exterior of the walls. Clearly, a significant amount of heat is being transferred through the uninsulated walls of barn 64. Location 116 is far enough from the adjacent wall that there is very little if any influence on the indicated temperature by reason of the cooling of the interior of the barn 64. Comparison of columns 120, 98, and 100 indicates that the temperature is relatively uniform throughout the interior of barn 64.

It has been found that thermally insulating the case that encloses the heat exchanger improves the efficiency of the system by as much as 10 percent or more. The temperature of the body of water on the shell side tends to be reduced by the presence of the thermal insulation. The degree of thermal insulation is preferably such that the exterior temperature of the shell side of the heat exchanger (Table 5, column 122T) is at least 3, and preferably 5 degrees Fahrenheit warmer than the equivalent uninsulated metal exterior shell side temperature at an ambient air temperature of approximately 80 degrees Fahrenheit. Changing from a metal case (18 gauge steel) to a fiberglass (glass filament reinforced thermosetting resin) case with a thickness of approximately one-eighth inch reduces the temperature by approximately 5 degrees at about 80 degrees Fahrenheit ambient internal air temperature. The efficiency of the air conditioning system also increases. Numerous forms of insulation and methods of application are suitable for this purpose, as will be understood by those skilled in the art.

The rate of water consumption in an air conditioning system according to the present invention is very low. For example, in the operation of the embodiment described herein with reference to FIG. 5 the rate of water consumption is no more than approximately 5 percent that of a conventional evaporative cooler (commonly described as a swamp cooler) operating under the same conditions. This low rate of water consumption is achieved even though the structure or other confined space is uninsulated, and is so unsealed that it is free to leak substantial volumes of air. In general, the rate of water consumption of a heat exchanger according to the present invention is less than approximately 10 percent, and preferably less than approximately 5 percent that of a conventional direct evaporative cooler (in a conventional evaporative cooler a single stream of air passes through a moist environment and is cooled and humidified by the evaporation of water) operating under substantially the same conditions external to the cooling systems. For comparison's sake, substantially the same external conditions comprise about the same exterior conditions of temperature and relative humidity, and the same structure or other confined space with, for example, the same volume, shape, and insulation. For purposes of comparison, the differences in the results from the operation of the cooling system of this invention as compared to the operation of a conventional evaporative cooler arises from the differences in the cooling systems, and not from the environment external to the coolers or the characteristics of the structure or other confined space. All of the variables, other than those inherent in the two cooling systems, are held constant for comparison purposes. That is, all of the external variables are held substantially constant. This low rate of water consumption is achieved while typically enjoying a humidifying efficiency (dry-bulb temperature drop across the heat exchanger divided by the maximum possible dry-bulb temperature drop as determined from a Psychrometric chart) of from approximately 30 to 40 percent.

The relative humidity within the interior of an air conditioned structure according to the present invention is substantially below that which would be expected from a conventional evaporative cooler. Comparison of, for example, the data in columns "116 T/H" and "120 T/H" in Tables 4 and 5 reveals that when the exterior ambient temperature exceeds approximately 95 degrees Fahrenheit, and the exterior ambient relative humidity falls below approximately 25 percent, the relative humidity within the structure is only approximately twice (200 percent) that in the exterior environment. As the exterior relative humidity falls below approximately 20 percent, and the temperature exceeds approximately 100 degrees Fahrenheit, the interior relative humidity is generally greater than approximately twice that of the ambient exterior environment, but still less than approximately 2.3 times (230 percent) that of the ambient exterior environment. These low interior relative humidities of less than approximately 50 percent are obtained while maintaining the interior ambient temperatures below approximately 85 degrees Fahrenheit despite exterior temperatures of approximately 110 to 120 degrees Fahrenheit. Typical interior relative humidities of less than approximately 60 percent are achieved according to the present invention whereas interior relative humidites in excess of approximately 60 percent are typically found with conventional evaporative coolers operated under the same conditions. This minimizes the growth of mold, and the like, as well as increasing the comfort of the occupants of the structure or other confined space. At these low relative humidites, temperatures of less than approximately 85 degrees Fahrenheit are generally comfortable for most people. As will be recognized by those skilled in the art, achieving these conditions with unsealed, uninsulated structures, and with a very low rate of water consumption using only an ambient energy harvesting system such as, for example, solar or wind energy, as described above, provides a very economical air conditioning system that is highly desirable and beneficial in many ways and for many purposes.

Typical cooling systems according to the present invention employ a heat exchanger with wet and dry sides that are preferably substantially hermetically sealed from one another. The water supply system on the wet side of the heat exchanger is generally provided primarily to humidify the air on the wet side. As is well understood by those skilled in the art with respect to conventional evaporative coolers, the liquid water on the wet side is divided or distributed by means of a spray or a wetted pad, or the like, so as to increase the surface area of the water, and, thus, the rate of evaporation of the water. Some chilling of the water on the wet side also necessarily occurs.

While the present invention has been described with reference to specific embodiments wherein the shell side of a heat exchanger is the wet side and the tube side is the dry side, those skilled in the art will readily appreciate from a consideration of these teachings that other arrangements are possible, including, for example, the use of a wet tube side and a dry shell side, or the like. Also, those skilled in the art will be taught by the teachings herein that other forms of heat exchangers other than shell and tube can be employed, if desired.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A cooling assembly comprising:
    a heat exchanger, said heat exchanger including a case member enclosing a wet side in heat exchange relationship with a dry side, said sides being substantially hermetically sealed from one another;
    a first air moving member adapted to move air through said dry side to produce a cooled stream of air;
    a liquid distributing member within said wet side;

a liquid sump element associated with said wet side and adapted to receive liquid from said wet side and to make said liquid available to said liquid distributing member;

at least two air moving members adapted to move air through said wet side from different locations to produce a humidified mass of turbulent air on said wet side, said humidified mass of turbulent air including a liquid phase of said liquid;

conduit members adapted to combine said cooled stream of air and said humidified mass of turbulent air at a location remote from said dry side and deliver the resultant combined stream of air to the interior of a structure.

2. A cooling assembly of claim 1 including a power source poweringly associated with said air moving members, said power source including an ambient energy harvesting member.

3. A cooling assembly of claim 1 wherein said liquid distributing member includes a pump and a spray head.

4. A cooling assembly:

a heat exchanger, said heat exchanger including a case member including a wet side in heat exchange relationship with a dry side, said wet and dry sides being substantially hermetically sealed from one another;

a first air moving member adapted to moving air through said dry side to produce a cooled stream of air;

a humidifying system air humidifyingly associated with said wet side;

at least two air moving members adapted to moving air through said wet side from different directions to produce a humidified mass of turbulent air on said wet side, said air moving members requiring electrical power for their operation;

conduit members adapted to combine said cooled stream of air and said humidified mass of turbulent air at a location remote from said dry side and deliver the resultant combined stream of air to the interior of a structure;

a secondary battery system, said secondary battery system being adapted to supplying all of said electrical power; and an ambient energy harvesting system chargingly associated with said secondary battery system.

5. A cooling assembly according to claim 4 wherein said at least two air moving members being adapted to drawing air from said interior.

6. A cooler installation for use in low humidity high temperature environments comprising:

a structure having an interior containing ambient air;

a tube and shell heat exchanger coolingly associated with said interior, said tube and shell heat exchanger including a case member confining a dry tube side and a wet shell side in heat exchanging relationship with one another;

a dry side air moving member air movingly associated with said dry side and adapted to move said ambient air through said dry side and to provide a dry side air stream;

a plurality of wet side air moving members air movingly associated with said wet side, and adapted to move air through said wet side from different directions and to provide a wet side air stream; and a water supply system humidifyingly associated with said wet side, said cooling installation being adapted to discharge said dry side and wet side air streams into said interior, said cooling installation being adapted to combine said dry side and wet side air streams before said discharge.

7. A cooling installation of claim 6 including a secondary battery system poweringly associated with said shell and tube heat exchanger, and an ambient energy harvesting system chargingly associated with a secondary battery system.

8. An air conditioning installation according to claim 6 wherein said cooling installation is adapted to cooling said ambient air on both said dry and wet sides.

9. An air conditioning installation according to claim 6 wherein said tube side is substantially hermetically sealed from said shell side, and said tube and shell heat exchanger is adapted to allowing heat to flow from said dry side to said wet side.

10. A cooling assembly comprising:

a heat exchanger, said heat exchanger including a wet side in heat exchanging relationship with a dry side;

a first air moving member adapted to moving air through said dry side to produce a cooled stream of air;

a water supply system air humidifyingly associated with said wet side;

a plurality of air moving members adapted to moving air from different sources through said wet side to produce a mass of moist turbulent air on said wet side, said air moving members requiring electrical power for their operation;

a secondary battery system, said secondary battery system being adapted to supplying all of said electrical power; and a solar energy harvesting system chargingly associated with said secondary battery system.

11. An air conditioning assembly for cooling the interior of a structure comprising:

a heat exchanger, said heat exchanger including a wet side in heat exchanging relationship with a dry side;

a first air moving member adapted to moving air through said dry side to produce a cooled stream of air;

a water supply system air humidifyingly associated with said wet side;

a plurality of air moving members adapted to moving air from different sources through said wet side to produce a mass of moist turbulent air on said wet side, said first and second air moving members and said water supply system all requiring electrical power for their operation, said air conditioning assembly being adapted to combining said cooled and moist turbulent streams of air in a confined space and discharging said combined streams of air into said interior;

a secondary battery system, said secondary battery system being adapted to supplying all of said electrical power; and an ambient energy harvesting system chargingly associated with said secondary battery system.

12. An air conditioning assembly of claim 11 wherein said ambient energy harvesting system comprises a solar cell.

13. An air conditioning assembly of claim 11 wherein said ambient energy harvesting system comprises a wind turbine.

14. An air conditioning assembly for cooling the interior of a structure comprising:

a heat exchanger, said heat exchanger having a shell side and a tube side;

a first air moving member adapted to move air through said tube side to produce a cooled stream of air;

a liquid dispensing member on said shell side adapted to distribute liquid substantially throughout said shell side;

a liquid sump element associated with said shell side and adapted to receive said liquid from said shell side and to make said liquid available to said liquid dispensing member;

a plurality of air moving members adapted to move air through said shell side from different directions to produce a turbulent mass of air on said shell side, said turbulent mass of air including a vapor phase of said liquid; and conduit members adapted to convey said cooled stream of air and said turbulent mass of air from said heat exchanger to an intersection and from said intersection to said interior.

15. An air conditioning assembly of claim 14 including a power source, said power source including solar panels.

16. An air conditioning installation for use in low humidity high temperature environments comprising:

a structure having an interior containing ambient air;

a tube and shell heat exchanger air conditioningly associated with said interior, said tube and shell heat exchanger including a tube side and a shell side, said tube side being adapted to being dry, and said shell side being adapted to being wet;

a tube side air moving member air movingly associated with said tube side and adapted to move said ambient air through said tube side and to provide a tube side air stream;

a plurality of shell side air moving members air movingly associated with said shell side, and adapted to move said ambient air through said shell side from different directions, to produce a turbulent mass of air on said shell side, and to provide a shell side air stream;

a water supply system wettingly associated with said shell side, said water supply system including a sump, a water emitting element on said shell side, and a water pump member circulatingly positioned between said sump and said water emitting element, said water supply system being adapted to maintain said shell side wet with water; and an air conduit system air receivingly associated with said tube and shell sides and adapted to combine said tube side and shell side air streams into a combined air stream at a location remote from said dry side and to discharge said combined air stream into said interior.

* * * * *